United States Patent
Kim et al.

(10) Patent No.: US 10,688,880 B2
(45) Date of Patent: Jun. 23, 2020

(54) BATTERY CHARGER FOR ELECTRIC VEHICLE

(71) Applicants: HYUNDAI MOTOR COMPANY, Seoul (KR); KIA MOTORS CORPORATION, Seoul (KR)

(72) Inventors: JongPil Kim, Yongin-si (KR); Sihun Yang, Hwaseong-si (KR); Woo Young Lee, Yongin-si (KR)

(73) Assignees: Hyundai Motor Company, Seoul (KR); KIA Motors Corporation, Seoul (KR)

( * ) Notice: Subject to any disclaimer, the term of this patent is extended or adjusted under 35 U.S.C. 154(b) by 0 days.

(21) Appl. No.: 16/171,030

(22) Filed: Oct. 25, 2018

(65) Prior Publication Data

US 2020/0023746 A1   Jan. 23, 2020

(30) Foreign Application Priority Data

Jul. 18, 2018   (KR) .................. 10-2018-0083322

(51) Int. Cl.
*B60L 53/22*   (2019.01)
*B60L 50/60*   (2019.01)
(Continued)

(52) U.S. Cl.
CPC .............. *B60L 53/22* (2019.02); *B60L 50/60* (2019.02); *B60L 53/14* (2019.02); *H02M 1/4233* (2013.01); *H02M 7/5387* (2013.01); *H02P 27/06* (2013.01); *B60K 1/04* (2013.01); *B60K 2001/0438* (2013.01); *B60L 2210/30* (2013.01);
(Continued)

(58) Field of Classification Search
CPC ........ H02M 1/4233; H02M 1/10; H02M 1/32; H02M 1/4216; H02M 1/44; H02M 1/126; H02M 1/36; H02M 5/4585; H02M 1/4225; H02M 7/219; H02M 7/5387; H02M 7/53871; B60L 53/22; B60L 2210/12; B60L 2210/40; B60L 2210/42; B60L 50/51; B60L 53/11; B60L 53/20; B60L 53/14; B60L 50/60; B60L 2210/30; H02J 7/022; H02J 7/00; H02J 7/14; H02K 53/00;
(Continued)

(56) References Cited

U.S. PATENT DOCUMENTS 9,493,080 B2 * 11/2016 Kvieska ................... H02J 7/022
9,783,072 B1 * 10/2017 Reddy ................. B60L 11/1816
(Continued)

*Primary Examiner* — Nha T Nguyen
(74) *Attorney, Agent, or Firm* — Brinks Gilson & Lione

(57) ABSTRACT

A battery charger of a vehicle which has a simple structure and a small size, and more particularly, a battery charger of an electric vehicle charging a battery using power supplied by a variety of power sources is provided. The battery charger of an electric vehicle includes a switch network which includes a first switch configured to connect any one of an AC power input line and a neutral line, which form an AC power input terminal, to a power factor corrector, one or more second switches configured to selectively connect the AC power input terminal to the power factor corrector, a link capacitor, or an inverter, and a third switch configured to electrically connect a motor to a high voltage battery, and a controller configured to control the power factor corrector and the switch network according to conditions of input AC power input through the AC power input terminal.

18 Claims, 13 Drawing Sheets

(51) Int. Cl.
  *B60L 53/14* (2019.01)
  *H02M 1/42* (2007.01)
  *H02M 7/5387* (2007.01)
  *H02P 27/06* (2006.01)
  *B60K 1/04* (2019.01)
  *H02M 1/44* (2007.01)
  *H02M 7/219* (2006.01)

(52) U.S. Cl.
  CPC ....... *B60L 2210/40* (2013.01); *B60Y 2200/91* (2013.01); *B60Y 2300/91* (2013.01); *H02M 1/44* (2013.01); *H02M 7/219* (2013.01)

(58) Field of Classification Search
  CPC .......... H02K 17/06; H02P 27/06; B60K 1/04; B60K 2001/0438; B60Y 2300/91; B60Y 2200/91
  See application file for complete search history.

(56) References Cited

U.S. PATENT DOCUMENTS

| | | | |
|---|---|---|---|
| 10,389,158 B2 * | 8/2019 | Schillinger | H02J 7/022 |
| 2009/0103341 A1 * | 4/2009 | Lee | B60W 10/26 363/124 |
| 2010/0080022 A1 | 4/2010 | Schmidt | |
| 2010/0237694 A1 * | 9/2010 | Fuma | B60L 15/007 307/9.1 |
| 2014/0232301 A1 * | 8/2014 | Dittmer | B60L 15/007 318/139 |
| 2014/0368131 A1 * | 12/2014 | Katsumata | B60L 53/14 318/51 |
| 2015/0091532 A1 * | 4/2015 | Kvieska | H02J 7/0052 320/137 |
| 2015/0097526 A1 * | 4/2015 | DeDona | B60L 53/18 320/109 |
| 2015/0123612 A1 * | 5/2015 | Ide | H02M 1/10 320/109 |
| 2015/0124505 A1 * | 5/2015 | Wang | H02M 7/219 363/126 |
| 2015/0130423 A1 * | 5/2015 | Tajima | B60L 58/20 320/137 |
| 2015/0191091 A1 * | 7/2015 | Kvieska | H02J 7/022 320/109 |
| 2017/0334303 A1 * | 11/2017 | Kristof | H01M 10/44 |
| 2018/0241337 A1 * | 8/2018 | Zou | B60L 50/51 |
| 2018/0254732 A1 * | 9/2018 | Smolenaers | H02J 7/022 |
| 2018/0281609 A1 * | 10/2018 | Yang | H02M 3/285 |
| 2018/0302006 A1 * | 10/2018 | Smidt | H02M 1/4233 |
| 2018/0367026 A1 * | 12/2018 | Rayner | H02M 1/14 |
| 2019/0023136 A1 * | 1/2019 | Lee | B60L 53/24 |
| 2019/0036462 A1 * | 1/2019 | Tazaki | H02M 1/32 |
| 2019/0074775 A1 * | 3/2019 | Chimento | H02M 1/10 |
| 2019/0092180 A1 * | 3/2019 | Zhu | B60L 15/00 |
| 2019/0222159 A1 * | 7/2019 | Kuroki | H02J 7/042 |
| 2019/0245432 A1 * | 8/2019 | Yan | H02M 3/33576 |
| 2019/0270382 A1 * | 9/2019 | Pfizenmaier | H02H 3/05 |
| 2019/0280586 A1 * | 9/2019 | Chen | H02M 3/33576 |
| 2019/0288539 A1 * | 9/2019 | Vela Garcia | B60L 53/60 |

* cited by examiner (I) BI-PHASE
SYMMETRIC
POWER SOURCE (II) SINGLE-PHASE
ASYMMETRIC
POWER SOURCE (III) THREE-PHASE SYMMETRIC POWER SOURCE

BATTERY CHARGER FOR ELECTRIC VEHICLE

CROSS-REFERENCE TO RELATED APPLICATION

The present application claims priority to and the benefit of Korean Patent Application No. 10-2018-0083322, filed on Jul. 18, 2018, which is incorporated herein by reference in its entirety.

FIELD

Some forms of the present disclosure relate to a vehicle, and more particularly, to a battery charger for an electrical vehicle which travels using only power of a motor.

BACKGROUND

The statements in this section merely provide background information related to the present disclosure and may not constitute prior art.

Different from internal-combustion vehicles which use fossil fuel as a main energy source, electric vehicles use electrical energy as a main energy source. Accordingly, an electric vehicle necessarily includes a high voltage battery capable of storing electrical energy, a motor as a power source, and an inverter for driving the motor.

Battery chargers for charging batteries of electric vehicles may be classified as slow chargers and rapid chargers. Slow chargers transmit commercial alternating current (AC) power as an AC power form to vehicles. On the other hand, rapid chargers convert commercial AC power to direct current (DC) and transmit the DC to vehicles. Slow chargers are advantageous for increasing penetration rates due to simple structures and low costs thereof. However, in order to use a slow charger, it is necessary to mount an on-board charger (OBC) in an electric vehicle.

AC power provided through a slow charger has a variety of types according to slow chargers installed in different nations. In order to charge a battery of an electric vehicle using the above-described variety of types of AC power, it is necessary that an OBC corresponds to a variety of types of commercial AC power.

To increase a one time traveling distance of an electric vehicle, greater capacity of a battery is better. Accordingly, manufacturers endeavor to increase battery capacity of electric vehicles. Employing a large-capacity battery accompanies an increase in charging time. In order to reduce a charging time of a large-capacity battery, it is necessary to increase capacity of an OBC. The increase in capacity of the OBC causes an increase in sizes of components and an increase in manufacturing costs.

SUMMARY

Therefore, it is an aspect of the present disclosure to provide a battery charger of a vehicle which has a simple structure and a small size and is capable of charging a battery using power supplied by a variety of power sources.

In accordance with one aspect of the present disclosure, a battery charger of an electric vehicle includes a motor configured to generate a driving force for driving the electric vehicle, an inverter configured to supply power to the motor, an alternating current (AC) power input terminal to which at least one of a single-phase input AC power and a multiphase input AC power is input, a power factor corrector which includes a single 3-leg half bridge circuit to which the input AC power is input through the AC power input terminal, a link capacitor charged by at least one combination of the power factor corrector, the motor, and the inverter, a switch network which includes a first switch (S1) configured to connect any one of an AC power input line and a neutral line, which form the AC power input terminal, to the power factor corrector, one or more second switches (S2)(S3)(S4)(S5) configured to selectively connect the AC power input terminal to the power factor corrector, the link capacitor, or the inverter, and a third switch (S6) configured to electrically connect the motor to a high voltage battery, and a controller configured to control the power factor corrector and the switch network according to conditions of input AC power input through the AC power input terminal.

The first switch (S1) may be provided at the AC power input terminal and be controlled to be turned on or off corresponding to single-phase and multiphase conditions of the input AC power.

The second switches of the switch network may include a fourth switch (S2) controlled to connect at least one leg of the power factor corrector to any one of the AC power input terminal and an input terminal of the inverter.

The second switches of the switch network may include a fifth switch (S3) provided between the power factor corrector and the link capacitor.

The second switches of the switch network may include a sixth switch (S5) and a seventh switch (S4) provided between both ends of the link capacitor and between both ends of the inverter, respectively.

A first leg of the power factor corrector may be connected to a first AC power input line of the AC power imputer terminal. A second leg of the power factor corrector may be connected to any one of a second AC power input line of the AC power input terminal and the neutral line through the first switch (S1). A third leg of the power factor corrector may be connected to any one of a third AC power input line of the AC power input terminal and the third switch through the fourth switch (S2).

Conditions of the input AC power may include single-phase and multiphase conditions of the input AC power.

Conditions of the input AC power may include symmetric and asymmetric power conditions of the input AC power.

In accordance with another aspect of the present disclosure, a battery charger of an electric vehicle includes a motor configured to generate a driving force for driving the electric vehicle, an inverter configured to supply power to the motor, an AC power input terminal to which at least one of a single-phase input AC power and a multiphase input AC power is input, a power factor corrector which includes a single 3-leg half bridge circuit to which the input AC power is input through the AC power input terminal, a link capacitor charged by at least one of combinations of the power factor corrector, the motor, and the inverter, a switch network which includes a first switch (S1) configured to connect any one of an AC power input line and a neutral line, which form the AC power input terminal, to the power factor corrector, one or more second switches (S2)(S3)(S4)(S5) configured to selectively connect the AC power input terminal to the power factor corrector, the link capacitor, or the inverter, and a third switch (S6) configured to electrically connect the motor to a high voltage battery, and a controller configured to control the power factor corrector and the switch network according to conditions of input AC power input through the AC power input terminal. Here, the third switch (S6) is configured to electrically connect a neutral point of the motor and both electrodes of the battery. Also, the second switches include a fourth switch (S2) controlled to connect at least one leg of the power factor corrector to any one of the AC power input terminal and an input terminal of the inverter.

The first switch (S1) may be provided at the AC power input terminal and be controlled to be turned on or off corresponding to single-phase and multiphase conditions of the input AC power.

The second switches of the switch network may further include a fifth switch (S3) provided between the power factor corrector and the link capacitor.

The second switches of the switch network may further include a sixth switch (S5) and a seventh switch (S4) between both ends of the link capacitor and between both ends of the inverter, respectively.

A first leg of the power factor corrector may be connected to a first AC power input line of the AC power imputer terminal. A second leg of the power factor corrector may be connected to any one of a second AC power input line of the AC power input terminal and the neutral line through the first switch (S1). A third leg of the power factor corrector may be connected to any one of a third AC power input line of the AC power input terminal and the third switch through the fourth switch (S2).

Conditions of the input AC power may include single-phase and multiphase conditions of the input AC power.

Conditions of the input AC power may include symmetric and asymmetric power conditions of the input AC power.

In accordance with still another aspect of the present disclosure, a battery charger of an electric vehicle includes a motor configured to generate a driving force for driving the electric vehicle, an inverter configured to supply power to the motor, an AC power input terminal to which at least one of a single-phase input AC power and a multiphase input AC power is input, a power factor corrector which includes a single 3-leg half bridge circuit to which the input AC power is input through the AC power input terminal, a link capacitor charged by at least one of combinations of the power factor corrector, the motor, and the inverter, a switch network which includes a first switch (S1) configured to connect any one of an AC power input line and a neutral line, which form the AC power input terminal, to the power factor corrector, one or more second switches (S2)(S3)(S4)(S5) configured to selectively connect the AC power input terminal to the power factor corrector, the link capacitor, or the inverter, and a third switch (S6) configured to electrically connect the motor to a high voltage battery, and a controller configured to control the power factor corrector and the switch network according to conditions of input AC power input through the AC power input terminal. Here, the third switch (S6) is configured to electrically connect a neutral point of the motor and both electrodes of the battery. Also, the second switches of the switch network include a fourth switch (S2) controlled to connect at least one leg of the power factor corrector to any one of the AC power input terminal and an input terminal of the inverter, a fifth switch (S3) provided between the power factor corrector and the link capacitor, and a sixth switch (S5) and a seventh switch (S4) between both ends of the link capacitor and between both ends of the inverter, respectively.

The first switch (S1) may be provided at the AC power input terminal and be controlled to be turned on or off corresponding to single-phase and multiphase conditions of the input AC power.

A first leg of the power factor corrector may be connected to a first AC power input line of the AC power imputer terminal. A second leg of the power factor corrector may be connected to any one of a second AC power input line of the AC power input terminal and the neutral line through the first switch (S1). A third leg of the power factor corrector may be connected to any one of a third AC power input line of the AC power input terminal and the third switch through the fourth switch (S2).

Conditions of the input AC power may include single-phase and multiphase conditions of the input AC power.

Conditions of the input AC power may include symmetric and asymmetric power conditions of the input AC power.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 5A:
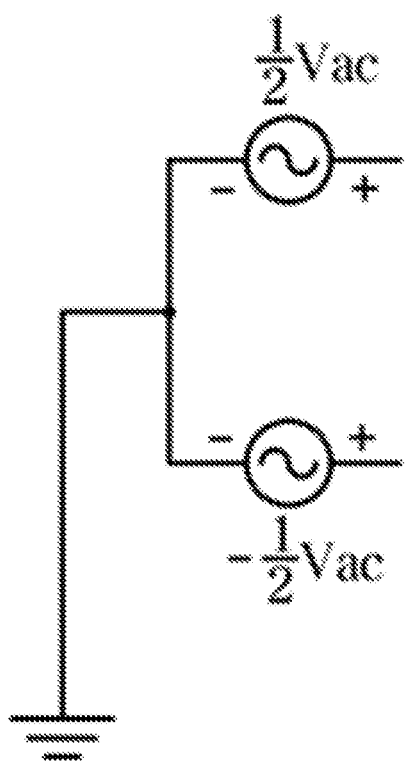
Figure 5B:
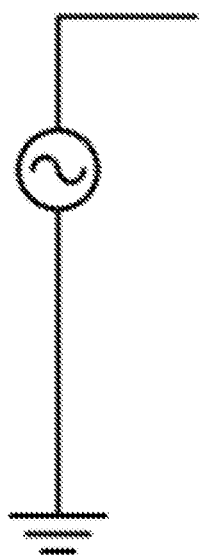
Figure 5C:
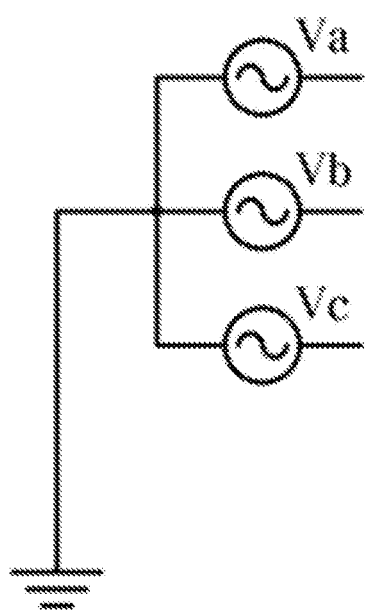
Figure 6:
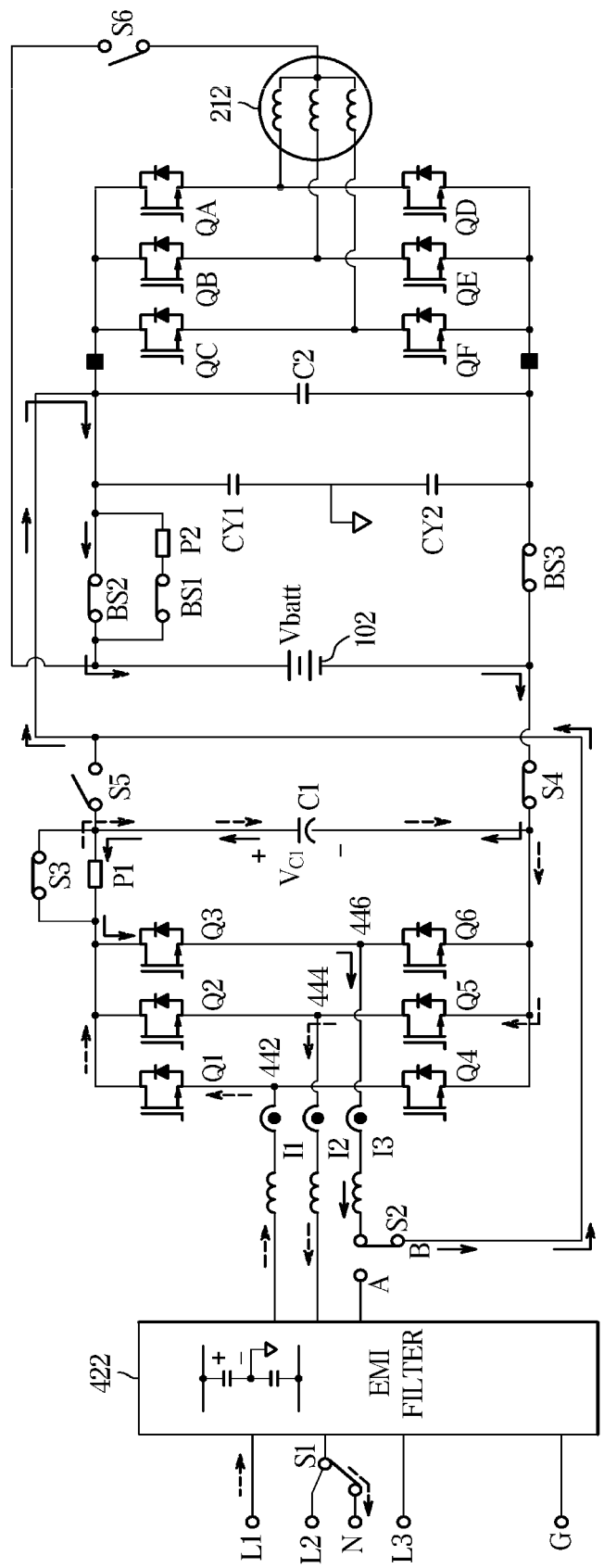
Figure 7:
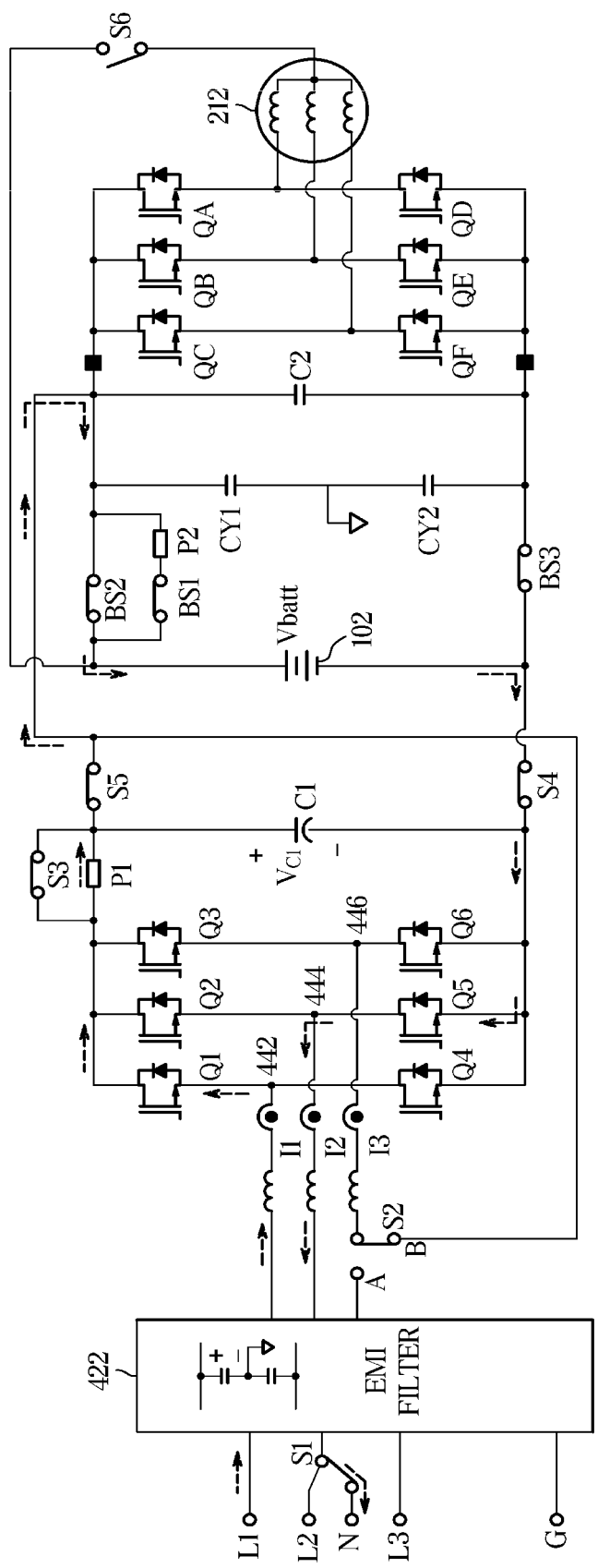
Figure 8:
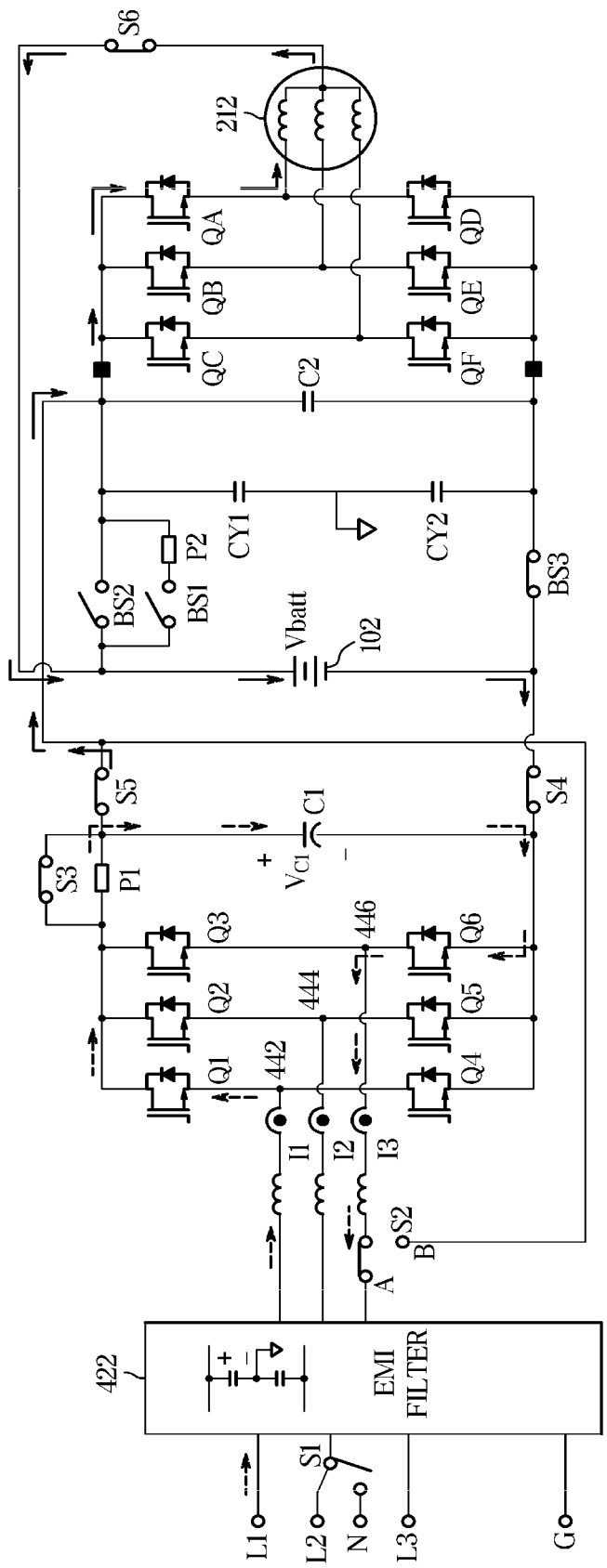
Figure 9:
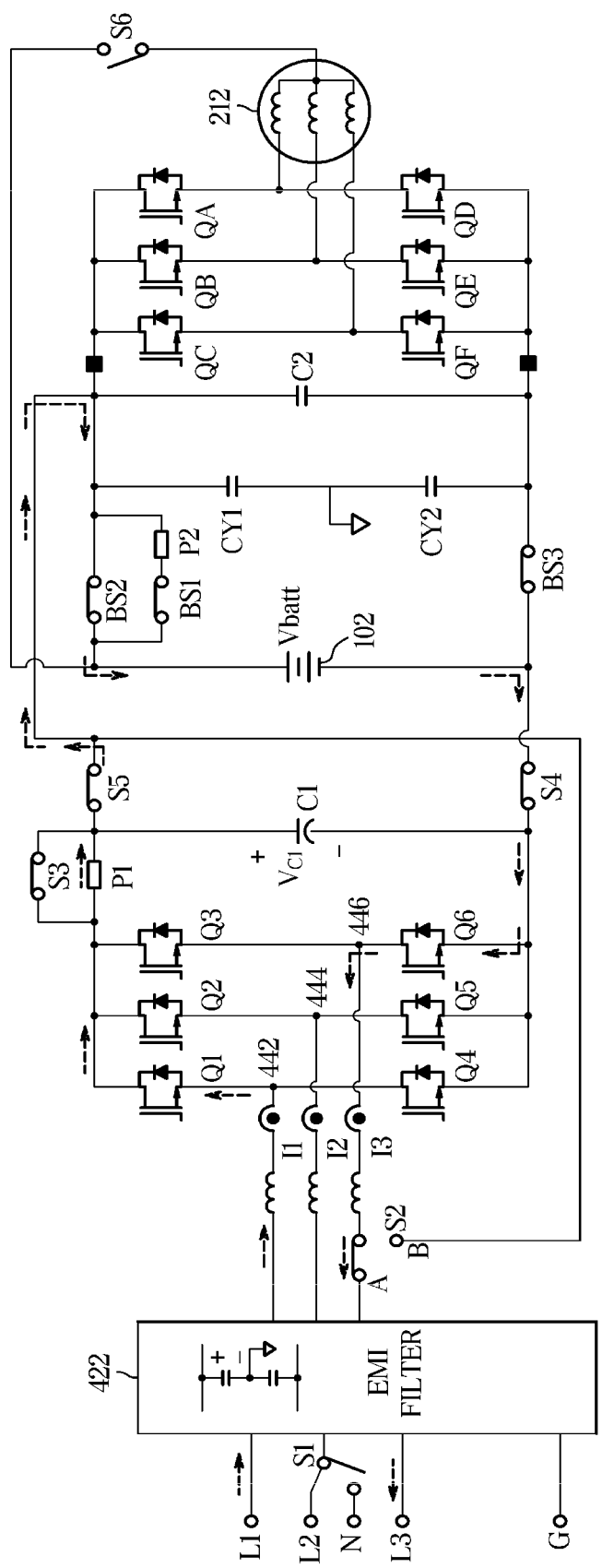
Figure 10:
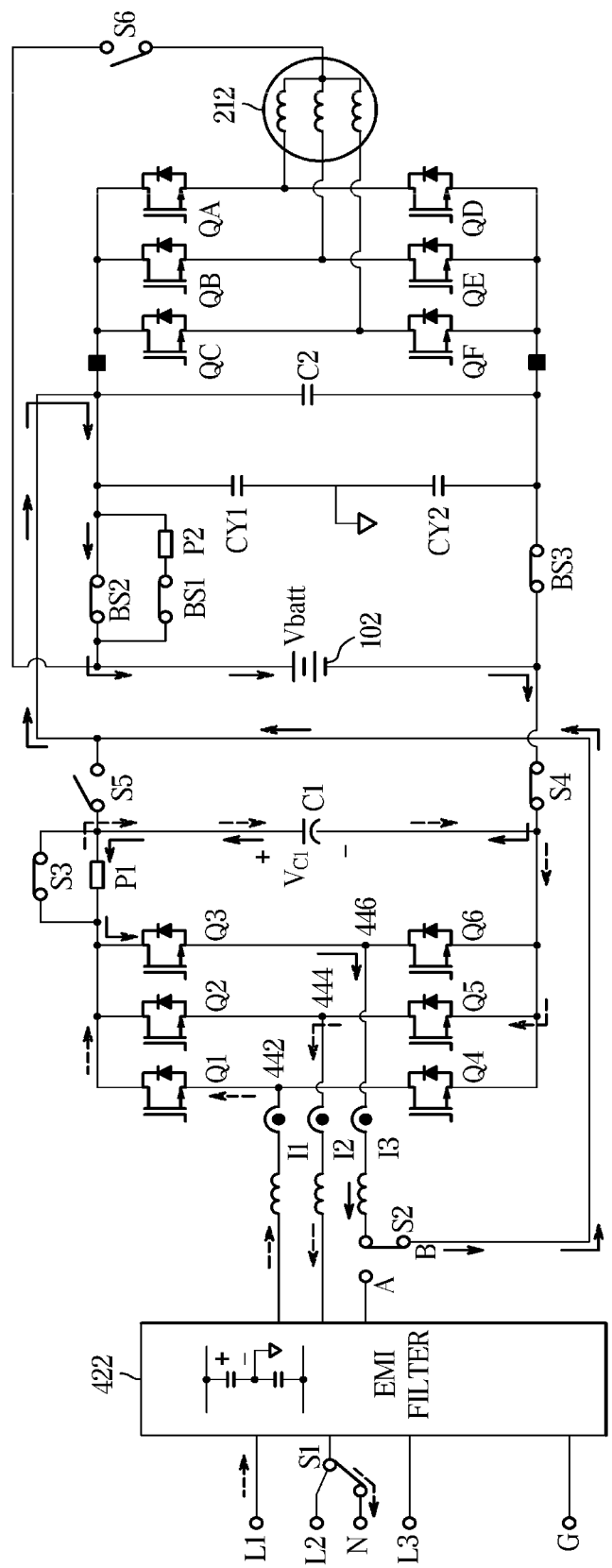
Figure 11:
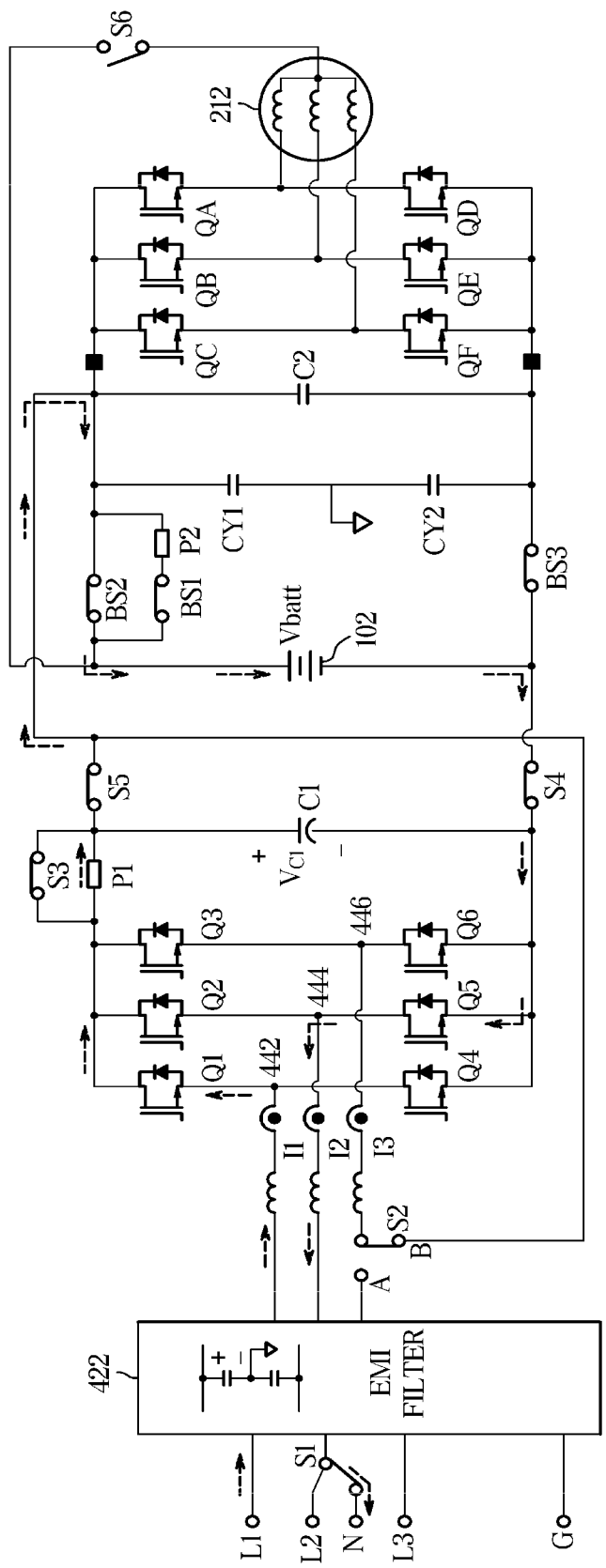

FIGS. 5A, 5B, and 5C are views illustrating a variety of power sources acceptable to the OBC in one form of the present disclosure;

FIGS. 6 and 7 are views illustrating on/off combinations of a switch network corresponding to a bi-phase symmetric power source in North America;

FIGS. 8 and 9 are views illustrating on/off combinations of a switch network corresponding to a three-phase symmetric power source in Europe; and FIGS. 10 and 11 are views illustrating on/off combinations of a switch network corresponding to a single-phase asymmetric power source in Korea and Europe.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
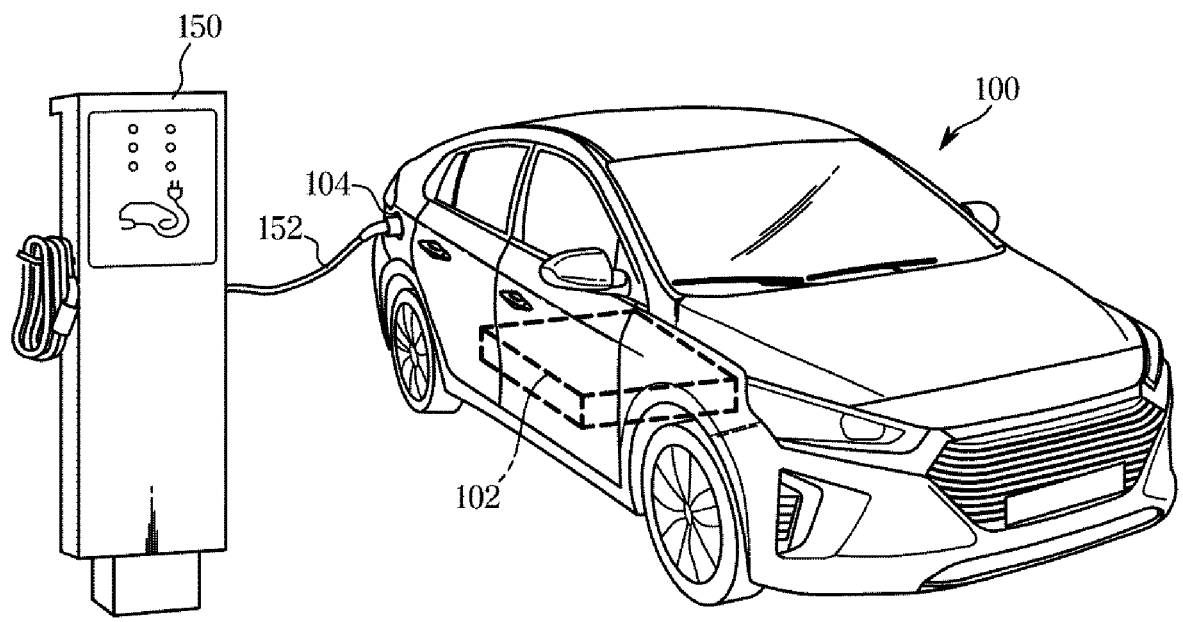
FIG. 1 is a view of an electric vehicle in one form of the present disclosure.

FIG. 1 is a view of an electric vehicle in one form of the present disclosure.

Figure 2:
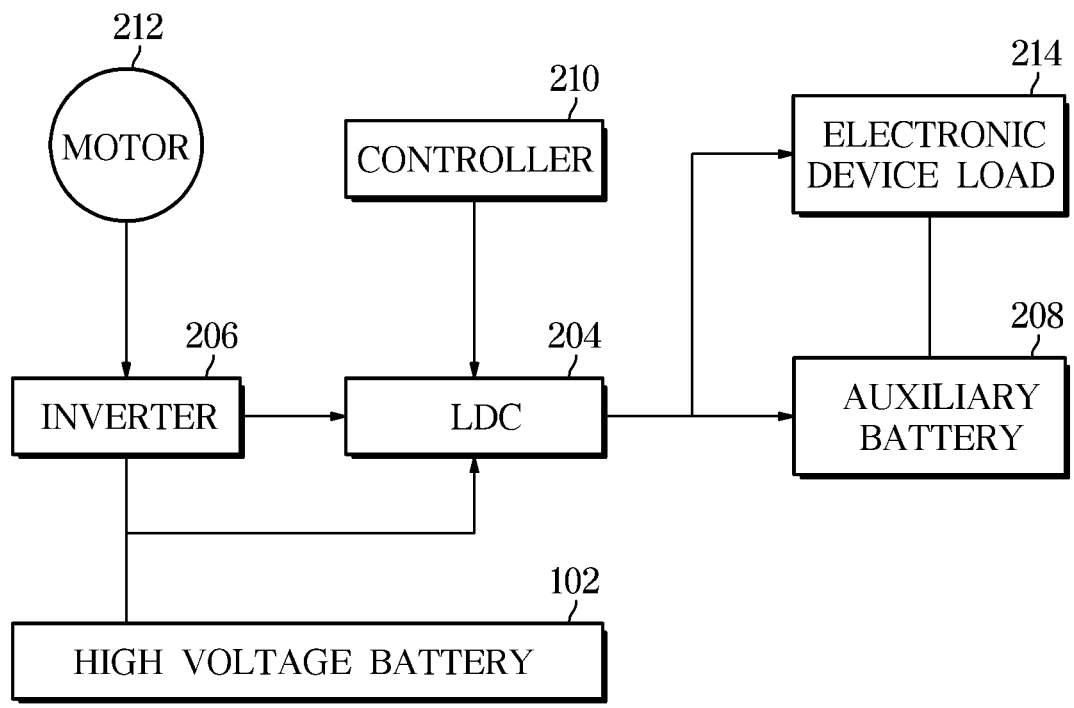
FIG. 2 is a view of a power supply device of the electric vehicle in one form of the present disclosure.

The electric vehicle 100 shown in FIG. 1 includes a motor 212 (refer to FIG. 2). Accordingly, a high voltage battery 102, which stores power for driving the motor 212, is necessary. An auxiliary battery 208 (refer to FIG. 2) is provided on one side of an engine room even in a general vehicle having an internal combustion engine. However, in the case of the electric vehicle 100, the high voltage battery 102 having a large size and high capacity is necessary. In the electric vehicle 100 in one form of the present disclosure, the high voltage battery 102 is installed in a space below second row seats. Power stored in the high voltage battery 102 may be used for driving the motor 212 to generate a driving force.

The high voltage battery 102 in one form of the present disclosure may be a lithium battery.

A charging socket 104 is provided in the electric vehicle 100. A charging connector 152 of an external slow charger 150 is connected to the charging socket 104 so that the high voltage battery 102 may be charged. That is, when the charging connector 152 of the slow charger 150 is connected to the charging socket 104 of the electric vehicle 100, the high voltage battery 102 of the electric vehicle 100 begins charging.

FIG. 2 is a view of a power supply device of the electric vehicle in one form of the present disclosure. The power supply device shown in FIG. 2 is for supplying power to the motor 212 and an electrical device load 214.

As shown in FIG. 2, the power supply device of the electric vehicle 100 in one form of the present disclosure includes the high voltage battery 102, a low voltage direct current (DC)-DC converter (hereinafter, LDC) 204, an inverter 206, auxiliary battery 208, and a controller 210.

The LDC 204 converts a high DC voltage of the high voltage battery 102 into a lower DC voltage. The LDC 204 converts the high DC voltage of the high voltage battery 102 into an AC voltage, drops the AC voltage through a coil, a transformer, a capacitor, and the like, and then rectifies the dropped AC voltage so as to convert the AC voltage into a lower DC voltage. The DC voltage with the pressure dropped by the LDC 204 is supplied to each electronic device load 214 which needs a low voltage.

The DC voltage of the high voltage battery 102 is converted, by the inverter 206, into an AC voltage having a certain phase and a frequency and is supplied to the motor 212. A rotating force and a speed of the motor 212 are determined by an output voltage of the inverter 206. The controller 210 controls overall operations of the power supply device.

Figure 3:
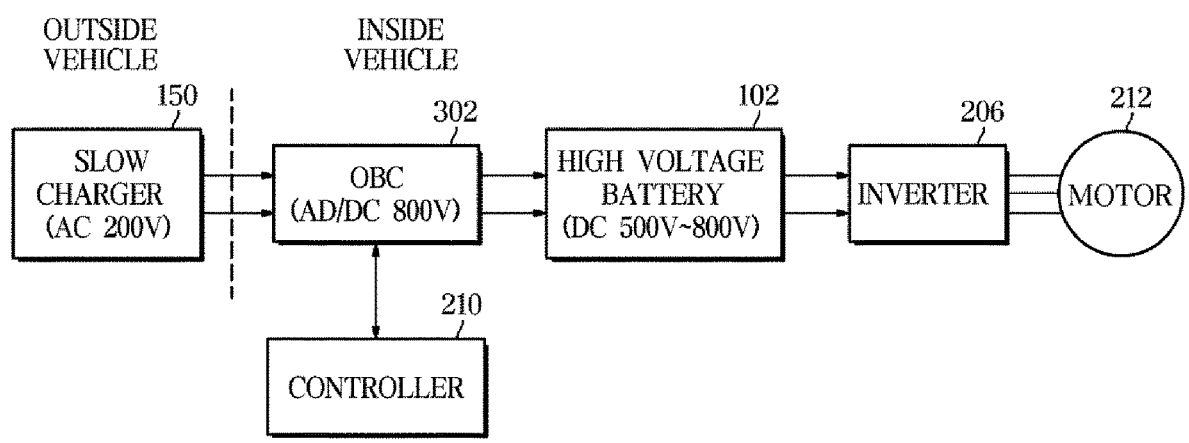
FIG. 3 is a view of a battery charger of the electric vehicle in one form of the present disclosure.

FIG. 3 is a view of the power supply device of the electric vehicle in one form of the present disclosure.

The slow charger 150 may be used for charging the high voltage battery 102 of the electric vehicle 100. The high voltage battery 102 may have a charging voltage of 500 V to 800 V. The slow charger 150 may supply commercial AC power as an AC power form to the electric vehicle 100. The AC power supplied through the slow charger 150 is converted into a DC voltage at a preset level in the electric vehicle 100.

In the electric vehicle 100, an on-board charger 302 engages in charging of the high voltage battery 102. The on-board charger 302 called OBC converts the commercial AC power supplied by the slow charger 150 into a DC voltage of 800 V to charge the high voltage battery 102. The slow charger 150 may supply commercial AC power as an AC power form to the electric vehicle 100. The AC voltage supplied from the slow charger 150 is converted into a DC voltage by the on-board charger 302 and is then used for charging the high voltage battery 102 in the electric vehicle 100.

Figure 4:
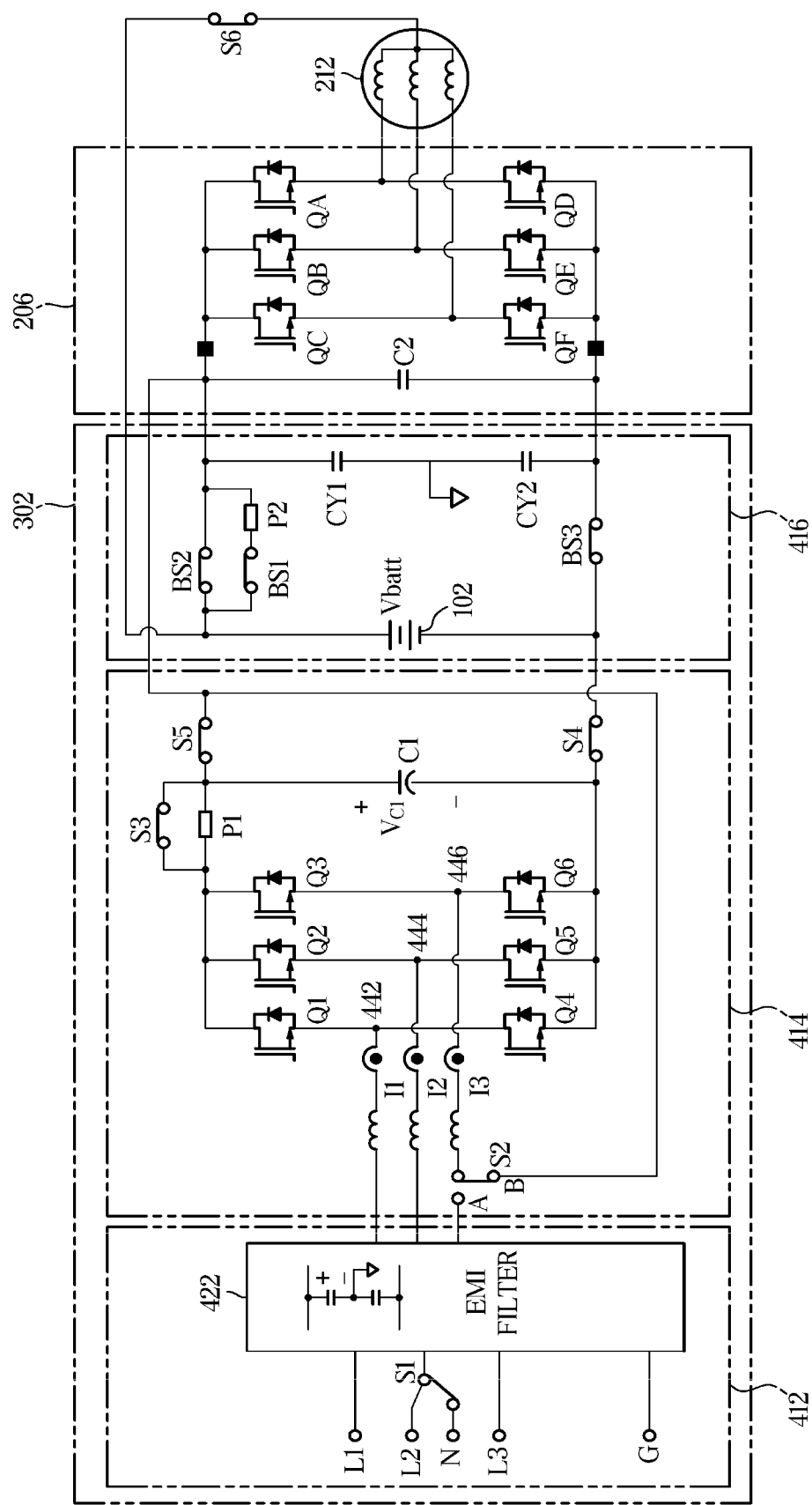
FIG. 4 is a configuration diagram of an on-board charger (OBC) in one form of the present disclosure.

FIG. 4 is a configuration diagram of an on-board charger in one form of the present disclosure. FIG. 4 illustrates how the on-board charger 302 in one form of the present disclosure is connected to the high voltage battery 102, the inverter 206, and the motor 212.

The on-board charger 302 includes an input portion 412, a boost power factor corrector 414, and a power relay assembly 416.

Commercial AC power is input from an external commercial AC power source to the input portion 412. The input portion 412 includes five input lines L1, L2, L3, N, and G, an electromagnetic interference filter (EMI) filter 422, and a switch S1.

The EMI filter 422 is provided to remove noise included in the input commercial AC power. The five input lines L1, L2, L3, N, and G are connected to the EMI filter 422. The commercial AC power is input from the external commercial AC power source to the EMI filter 422 through the input lines L1, L2, L3, N, and G. L1, L2, and L3 are AC power input lines, N is a neutral line, and G is a ground line.

Maximally, three-phase AC power may be input to the EMI filter 422 through the AC power input lines L1, L2, and L3 among the input lines L1, L2, L3, N, and G. That is, three-phase AC power may be input to the EMI filter 422 through all the AC power input lines L1, L2, and L3. Otherwise, two-phase AC power may be input to the EMI filter 422 through only the AC power input lines L1 and L2. Otherwise, single-phase AC power may be input to the EMI filter 422 through only the AC power input line L1 and the neutral line N.

The switch S1 of the input portion 412 connects one of the AC power input line L2 and the neutral line N to the EMI filter 422. In the case of three-phase or two-phase input commercial AC power, the switch S1 is controlled to connect the AC power input line L2 to the EMI filter 422. When input commercial AC power has a single phase, the switch S1 is controlled to connect the neutral line N to the EMI filter 422.

The boost power factor corrector 414 is basically configured as a 3-leg half bridge circuit which includes switching elements Q1, Q2, Q3, Q4, Q5, and Q6. First to third legs 442, 444, and 446 formed between Q1 and Q4, Q2 and Q5, and Q3 and Q6, respectively, are connected to the EMI filter 422. Phase currents 11, 12, and 13 of respective phases transferred from the EMI filter 422 to the half bridge circuit of the boost power factor corrector 414 may be detected at the first to third legs 442, 444, and 446. Each of the first to third legs 442, 444, and 446 may include an inductor component.

A switch S2 is provided between the leg 446 among three legs, which is formed between the switching elements Q3 and Q6, and an output terminal of the EMI filter 422. The switch S2 is controlled to connect the leg 446 of the 3-leg half bridge circuit to any one of the output terminal of the EMI filter 422 and an output terminal of the boost power factor corrector 414. That is, the switch S2 connects the leg 446 of the 3-leg half bridge circuit to the output terminal of the EMI filter 422 through a node A or connects the leg 446 of the 3-leg half bridge circuit to the output terminal of the boost power factor corrector 414 through a node B. The output terminal of the boost power factor corrector 414, to which the node B of the switch S2 is connected, is connected to an input terminal of the inverter 206 which drives the motor. Accordingly, when the switch S2 is connected to the node B, the leg 446 of the 3-leg half bridge circuit is connected to the input terminal of the inverter 206.

Also, a capacitor C1, which is a perfluorinated compound (PFC) link capacitor, is provided in the boost power factor corrector 414. The capacitor C1 is provided between both ends of the half bridge circuit.

Also, switches S3, S4, and S5 are further included in the boost power factor corrector 414. Among them, the switch S3 is connected to a power factor correcting element P1 in parallel between a top end of the half bridge circuit and a positive electrode of the above-described capacitor C1. The switch S4 is provided at one end of the capacitor C1 and electrically connects the boost power factor corrector 414 to the power relay assembly 416 which will be described below. That is, the boost power factor corrector 414 is electrically connected to the power relay assembly 416 through the switch S4. That is, the boost power factor corrector 414 is also electrically connected to one end of the high voltage battery 102 through the switch S4. The switch S5 is connected to the other end of the capacitor C1 and forms the output terminal of the above-stated boost power factor corrector 414. One end of the switch S5 is connected to the capacitor C1, and the other end of the switch S5 is connected to the node B of the switch S2 and the input terminal of the inverter 206.

Capacitors CY1 and CY2, which are equivalent modeling Y capacitors, are connected in series to the power relay assembly 416. A node, to which the capacitors CY1 and CY2 are connected, is grounded.

Two switches BS1 and BS2 and one power factor element P2 are provided between the capacitor CY1 and a positive electrode of the high voltage battery 102. The switch BS1 and the power factor element P2 are connected in series between the capacitor CY1 and the positive electrode of the high voltage battery 102. The switch BS2 is connected to the serial connection structure in parallel.

A switch BS3 is provided between the capacitor CY2 and a negative electrode of the high voltage battery 102.

A positive electrode+of the high voltage battery 102 is connected to a neutral point of the motor 212 through a switch S6.

The inverter 206 includes six switching elements QA, QB, QC, QD, QE, and QF. Currents generated by the switching elements QC and QF, currents generated by the switching elements QB and QE, and currents generated by the switching elements QA and QD are applied to a three-phase coil of the motor 212.

A plurality of such switches S1, S2, S3, S4, S5, S6, BS1, BS2, and BS3, which form a switch network provided in the on-board charger 302 of FIG. 4, and a plurality of such switching elements Q1, Q2, Q3, Q4, Q5, Q6, QA, QB, QC, QD, QE, and QF are controlled by the controller 210 described above with reference to FIGS. 2 and 3 to be turned on or turned off. In some forms of the present disclosure, the high voltage battery 102 may be charged by a variety of types of commercial AC power through a variety of on/off combinations of the plurality of switches S1, S2, S3, S4, S5, S6, BS1, BS2, and BS3 which form the switch network. The variety of types of commercial AC power will be described in detail with reference to FIG. 5.

FIGS. 5A, 5B, and 5C are views illustrating a variety of power sources acceptable to the on-board charger in some forms of the present disclosure.

FIG. 5A illustrates a bi-phase symmetric power source. As shown in FIG. 5A, in the bi-phase symmetric power source, a voltage of supplied power is divided into two voltages ½ Vac and −½ Vac to be supplied. Since the two voltages ½Vac and −½Vac have diametrical opposite phases, it is called the bi-phase symmetric power source. The bi-phase symmetric power source shown in FIG. 5A is generally used in North America.

FIG. 5B illustrates a single-phase asymmetric power source. As shown in FIG. 5B, in the single-phase asymmetric power source, a voltage of supplied power is supplied in a form of a single voltage Vac having a single phase. Since the single voltage Vac has the single phase, it is called a single-phase asymmetric power source. The single-phase asymmetric power source shown in FIG. 5B is generally used in Korea, North America, and Europe.

FIG. 5C illustrates a three-phase symmetric power source. As shown in FIG. 5C, in the three-phase symmetric power source, a voltage of supplied power is divided into three voltages Va, Vb, and Vc to be supplied. Since the three voltages Va, Vb, and Vc have different phases, it is called the three-phase symmetric power source. The three-phase symmetric power source shown in FIG. 5C is generally used in Europe.

As described above, since a type of commercial AC power varies for each nation, the on-board charger 302 in some forms of the present disclosure is intended to correspond to a variety of commercial AC power sources for each nation through an on/off combination of a switch network. For example, with respect to the bi-phase symmetric power source, a single-phase full bridge inverter type boost power factor corrector is embodied so as to charge the high voltage battery 102. Also, for example, with respect to the single-phase asymmetric power source, a single-phase full bridge inverter type boost power factor corrector is embodied with a buck converter so as to charge the high voltage battery 102. Also, for example, with respect to the three-phase symmetric power source, a 3-leg boost power factor corrector is embodied with a motor/inverter buck converter so as to charge the high voltage battery 102.

FIGS. 6 to 11 are views illustrating on/off combinations of a switch network to correspond to a variety of commercial AC power sources for each nation.

FIGS. 6 and 7 are views illustrating on/off combinations of a switch network corresponding to a bi-phase symmetric power source in North America. In particular, FIG. 6 is a view illustrating controlling of the switch network when a peak value of a voltage Vc1 of the capacitor C1 is greater than a required charging voltage Vbatt of the high voltage battery 102. Also, FIG. 7 is a view illustrating controlling of the switch network when a peak value of a voltage Vc1 of the capacitor C1 is less than the required charging voltage Vbatt of the high voltage battery 102.

FIGS. 8 and 9 are views illustrating on/off combinations of a switch network corresponding to three-phase symmetric power source in Europe In particular, FIG. 8 is a view illustrating controlling of the switch network when a peak value of the voltage Vc1 of the capacitor C1 is greater than the required charging voltage Vbatt of the high voltage battery 102. Also, FIG. 9 is a view illustrating controlling of the switch network when a peak value of the voltage Vc1 of the capacitor C1 is less than the required charging voltage Vbatt of the high voltage battery 102.

FIGS. 10 and 11 are views illustrating on/off combinations of the switch network corresponding to single-phase asymmetric power source in Korea and Europe. In particular, FIG. 10 is a view illustrating controlling of the switch network when a peak value of the voltage Vc1 of the capacitor C1 is greater than the required charging voltage Vbatt of the high voltage battery 102. Also, FIG. 11 is a view illustrating controlling of the switch network when a peak value of the voltage Vc1 of the capacitor C1 is less than the required charging voltage Vbatt of the high voltage battery 102.

FIG. 6 is a view illustrating an on/off combination of the switch network corresponding to the bi-phase symmetric power source in North America. In particular, FIG. 6 is a view illustrating controlling of the switch network when a peak value of the voltage Vc1 of the capacitor C1 is greater than the required charging voltage Vbatt of the high voltage battery 102.

In FIG. 6, the on/off combination of switches which form the switch network is as follows.

S1: N, S2: B, S3: ON, S4: ON, S5: OFF, S6: OFF
BS1: ON, BS2: ON, BS3: ON

The switch S1 is controlled so that the neutral line N is connected to the EMI filter 422. Hereby, bi-phase symmetric AC power may be input through the AC power input line L1 and the neutral line N. The switch S2 is connected to the node B. Hereby, the leg 446 of the boost power factor corrector 414 is connected to the input terminal of the inverter 206. The switch S5 is turned off. Hereby, the output terminal of the boost power factor corrector 414 is not connected to the input terminal of the inverter 206. Also, the switch S6 is turned off. Hereby, the neutral point of the motor 212 and the power relay assembly 416 are electrically short-circuited.

In addition, the switching elements Q1, Q3, and Q5 of the boost power factor corrector 414 are turned on.

Through the above-described on/off combination of the switch network, the capacitor C1 is charged along a path shown as a dotted arrow in FIG. 6. Also, a charging voltage of the capacitor C1 charges the high voltage battery 102 through the power relay assembly 416 along a path shown as a solid arrow in FIG. 6. Charging of the high voltage battery 102 by the charging voltage of the capacitor C1 is caused by the peak value of the voltage Vc1 of the capacitor C1 being greater than the required charging voltage Vbatt of the high voltage battery 102.

A single-phase full bridge inverter type boost power factor corrector and a buck converter mode are embodied through the above-described on/off combination of the switch network so as to correspond to the bi-phase symmetric power source in North America.

FIG. 7 is a view illustrating an on/off combination of the switch network corresponding to the bi-phase symmetric power source in North America. In particular, FIG. 7 is a view illustrating controlling of the switch network when a peak value of the voltage Vc1 of the capacitor C1 is less than the required charging voltage Vbatt of the high voltage battery 102.

In FIG. 7, the on/off combination of switches which form the switch network is as follows.

S1: N, S2: B, S3: ON, S4: ON, S5: ON, S6: OFF
BS1: ON, BS2: ON, BS3: ON

The switch S1 is controlled so that the neutral line N is connected to the EMI filter 422. Hereby, bi-phase symmetric AC power may be input through the AC power input line L1 and the neutral line N. The switch S2 is connected to the node B. Hereby, the leg 446 of the boost power factor corrector 414 is connected to the input terminal of the inverter 206. The switch S5 is turned on. Hereby, the output terminal of the boost power factor corrector 414 is connected to the input terminal of the inverter 206. Also, the switch S6 is turned off. Hereby, the neutral point of the motor 212 and the power relay assembly 416 are electrically short-circuited.

In addition, the switching elements Q1 and Q5 of the boost power factor corrector 414 are turned on.

Through the above-described on/off combination of the switch network, the high voltage battery 102 is charged along a path shown as a dotted arrow in FIG. 7. Charging of the high voltage battery 102 by the bi-phase symmetric AC power input through the EMI filter 422 is caused by the peak value of the voltage Vc1 of the capacitor C1 being less than the required charging voltage Vbatt of the high voltage battery 102. Due to this, the neutral point of the motor 212 and the power relay assembly 416 are electrically short-circuited by turning the switch S6 off so that the high voltage battery 102 is directly charged by the bi-phase symmetric AC power input through the EMI filter 422.

A single-phase full bridge inverter type boost power factor corrector is embodied through the above-described on/off combination of the switch network so as to correspond to the bi-phase symmetric power source in North America.

FIG. 8 is a view illustrating an on/off combination of the switch network corresponding to the three-phase symmetric power source in Europe. In particular, FIG. 8 is a view illustrating controlling of the switch network when a peak value of the voltage Vc1 of the capacitor C1 is greater than the required charging voltage Vbatt of the high voltage battery 102.

In FIG. 8, the on/off combination of switches which form the switch network is as follows.

S1: OFF(L2), S2: A, S3: ON, S4: ON, S5: ON, S6: ON
BS1: OFF, BS2: OFF, BS3: ON

The switch S1 is turned off. Hereby, three-phase symmetric AC power may be input through the AC power input line L1 and another AC power input line L2. The switch S2 is connected to the node A. Hereby, the leg 446 of the boost power factor corrector 414 is connected to the AC power input line L3 through the EMI filter 422. The switch S6 is turned on. Hereby, the power relay assembly 416 and the neutral point of the motor 212 are electrically conducted.

In addition, the switching elements Q1, Q3, and Q5 of the boost power factor corrector 414 and the switching element QB of the inverter 206 are turned on. The switch BS1 and BS2 of the power relay assembly 416 are turned off.

Through the above-described on/off combination of the switch network, the capacitor C1 is charged along a path shown as a dotted arrow in FIG. 8. Also, the charging voltage of the capacitor C1 charges the high voltage battery 102 through the motor 212 and the inverter 206 along a path shown as a solid arrow in FIG. 8. Charging of the high voltage battery 102 by the charging voltage of the capacitor C1 is caused by a peak value of the voltage Vc1 of the capacitor C1 being greater than the required charging voltage Vbatt of the high voltage battery 102.

The three-phase boost power factor corrector, the buck converter mode, and a motor/inverter LC filter are embodied using a single phase of a line voltage through the above-described on/off combination of the switch network so as to correspond to the three-phase symmetric power source in Europe.

FIG. 9 is a view illustrating an on/off combination of the switch network corresponding to the three-phase symmetric power source in Europe. In particular, FIG. 9 is a view illustrating controlling of the switch network when a peak value of the voltage Vc1 of the capacitor C1 is less than the required charging voltage Vbatt of the high voltage battery 102.

In FIG. 9, the on/off combination of switches which form the switch network is as follows.

S1: OFF(L2), S2: A, S3: ON, S4: ON, S5: ON, S6: OFF
BS1: ON, BS2: ON, BS3: ON

The switch S1 is turned off. Hereby, three-phase symmetric AC power may be input through the AC power input line L1 and the AC power input line L2. The switch S2 is connected to the node A. Hereby, the leg 446 of the boost power factor corrector 414 is connected to the AC power input line L3 through the EMI filter 422. The switch S6 is turned off. Hereby, the power relay assembly 416 and the neutral point of the motor 212 are electrically short-circuited.

In addition, the switching elements Q1 and Q6 of the boost power factor corrector 414 are turned on.

Through the above-described on/off combination of the switch network, the high voltage battery 102 is charged along a path shown as a dotted arrow in FIG. 9. Charging of the high voltage battery 102 by the three-phase symmetric AC power input through the EMI filter 422 is caused by a peak value of the voltage Vc1 of the capacitor C1 being less than the required charging voltage Vbatt of the high voltage battery 102. Due to this, the third leg 446 of the boost power factor corrector 414 and the AC power input line L3 are electrically connected by connecting the switch S2 to the node A so that the high voltage battery 102 is directly charged by the three-phase symmetric AC power input through the EMI filter 422.

A three-phase full bridge inverter type boost power factor corrector is embodied through the above-described on/off combination of the switch network so as to correspond to the three-phase symmetric power source in Europe.

FIG. 10 is a view illustrating an on/off combination of the switch network corresponding to a single-phase asymmetric power source in Korea and Europe. In particular, FIG. 10 is a view illustrating controlling of the switch network when a peak value of the voltage Vc1 of the capacitor C1 is greater than the required charging voltage Vbatt of the high voltage battery 102.

In FIG. 10, the on/off combination of switches which form the switch network is as follows.

S1: N, S2: B, S3: ON, S4: ON, S5: OFF, S6: OFF
BS1: ON, BS2: ON, BS3: ON

The switch S1 is controlled so that the neutral line N is connected to the EMI filter 422. Hereby, single-phase asymmetric AC power may be input through the AC power input line L1 and the neutral line N. The switch S2 is connected to the node B. Hereby, the leg 446 of the boost power factor corrector 414 is connected to the input terminal of the inverter 206. Also, the switch S6 is turned off. Hereby, the neutral point of the motor 212 and the power relay assembly 416 are electrically short-circuited.

In addition, the switching elements Q1, Q3, and Q5 of the boost power factor corrector 414 are turned on.

Through the above-described on/off combination of the switch network, the capacitor C1 is charged along a path shown as a dotted arrow in FIG. 10. Also, the high voltage battery 102 is charged by the charging voltage of the capacitor C1 along a path shown as a solid arrow in FIG. 10. Charging of the high voltage battery 102 by the charging voltage of the capacitor C1 is caused by a peak value of the voltage Vc1 of the capacitor C1 being greater than the required charging voltage Vbatt of the high voltage battery 102.

A single-phase full bridge inverter type boost power factor corrector and a buck converter mode are embodied through the above-described on/off combination of the switch network so as to correspond to the single-phase asymmetric power source in Korea and Europe.

FIG. 11 is a view illustrating an on/off combination of the switch network corresponding to a single-phase asymmetric power source in Korea and Europe. In particular, FIG. 11 is a view illustrating controlling of the switch network when a peak value of the voltage Vc1 of the capacitor C1 is less than the required charging voltage Vbatt of the high voltage battery 102.

In FIG. 11, the on/off combination of switches which form the switch network is as follows.

S1: N, S2: B, S3: ON, S4: ON, S5: ON, S6: OFF
BS1: ON, BS2: ON, BS3: ON

The switch S1 is controlled so that the neutral line N is connected to the EMI filter 422. Hereby, bi-phase symmetric AC power may be input through the AC power input line L1 and the neutral line N. The switch S2 is connected to the node B. Hereby, the leg 446 of the boost power factor corrector 414 is connected to the input terminal of the inverter 206. The switch S6 is turned off. Hereby, the power relay assembly 416 and the neutral point of the motor 212 are electrically short-circuited.

In addition, the switching elements Q1 and Q5 of the boost power factor corrector 414 are turned on.

Through the above-described on/off combination of the switch network, the high voltage battery 102 is charged along a path shown as a dotted arrow in FIG. 11. Charging of the high voltage battery 102 by the bi-phase symmetric AC power input through the EMI filter 422 is caused by the peak value of the voltage Vc1 of the capacitor C1 being less than the required charging voltage Vbatt of the high voltage battery 102. Due to this, the power relay assembly 416 and the neutral point of the motor 212 are electrically short-circuited by turning the switch S6 off so that the high voltage battery 102 is directly charged by the bi-phase symmetric AC power input through the EMI filter 422.

A single-phase full bridge inverter type boost power factor corrector is embodied through the above-described on/off combination of the switch network so as to correspond to the single-phase asymmetric power source in Korea and Europe.

The single-phase full bridge inverter type boost power factor corrector is embodied through the above-described on/off combination of the switch network so as to correspond to the single-phase asymmetric power source in North America.

As is apparent from the above description, a battery charger of a vehicle in one form of the present disclosure has a simple structure and a small size and is capable of charging a battery using power supplied by a variety of power sources.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A battery charger of an electric vehicle, comprising:
    a motor configured to generate a driving force for driving the electric vehicle;
    an inverter configured to supply power to the motor;
    an alternating current (AC) power input terminal, wherein at least one of a single-phase input AC power or a multiphase input AC power is input to the AC power input terminal;
    a power factor corrector comprising a single 3-leg half bridge circuit, wherein an input AC power is input to the single 3-leg half bridge circuit through the AC power input terminal;
    a link capacitor charged by at least one of the power factor corrector, the motor, or the inverter;
    a switch network comprising:
        a first switch configured to connect any one of an AC power input line or a neutral line to the power factor corrector, wherein the AC power input terminal comprises the AC power input line and the neutral line;

a plurality of second switches configured to selectively connect the AC power input terminal to the power factor corrector, the link capacitor, or the inverter; and a third switch configured to electrically connect the motor to a high voltage battery; and a controller configured to control the power factor corrector and the switch network based on conditions of the input AC power that is input through the AC power input terminal;

wherein the plurality of second switches comprises a sixth switch provided between each end of the link capacitor, and a seventh switch provided between each end of the inverter.

2. The battery charger of claim 1, wherein the first switch provided at the AC power input terminal is configured to be turned on or off corresponding to a single-phase condition of the input AC power and a multiphase condition of the input AC power.

3. The battery charger of claim 1, wherein the plurality of second switches comprises:

a fourth switch configured to connect at least one leg of the power factor corrector to any one of the AC power input terminal or an input terminal of the inverter.

4. The battery charger of claim 3, wherein the plurality of second switches comprises:

a fifth switch provided between the power factor corrector and the link capacitor.

5. The battery charger of claim 1, wherein:

a first leg of the power factor corrector is connected to a first AC power input line of the AC power input terminal;

a second leg of the power factor corrector is connected to any one of a second AC power input line of the AC power input terminal or the neutral line through the first switch; and a third leg of the power factor corrector is connected to any one of a third AC power input line of the AC power input terminal or the third switch through the fourth switch.

6. The battery charger of claim 1, wherein the conditions of the input AC power comprise the single-phase condition of the input AC power and the multiphase condition of the input AC power.

7. The battery charger of claim 1, wherein the conditions of the input AC power comprise a symmetric power condition of the input AC power and an asymmetric power condition of the input AC power.

8. A battery charger of an electric vehicle, comprising:

a motor configured to generate a driving force for driving the electric vehicle;

an inverter configured to supply power to the motor;

an alternating current (AC) power input terminal, wherein at least one of a single-phase input AC power or a multiphase input AC power is input to the Ac power input terminal;

a power factor corrector comprising a single 3-leg half bridge circuit, wherein an input AC power is input to the single 3-leg half bridge circuit through the AC power input terminal;

a link capacitor charged by at least one of the power factor corrector, the motor, or the inverter;

a switch network comprising:

a first switch configured to connect any one of an AC power input line or a neutral line to the power factor corrector, wherein the AC power input terminal comprises the AC power input line and the neutral line;

a plurality of second switches configured to selectively connect the AC power input terminal to the power factor corrector, the link capacitor, or the inverter; and a third switch configured to electrically connect the motor to a high voltage battery; and a controller configured to control the power factor corrector and the switch network based on conditions of the input AC power that is input through the AC power input terminal, wherein the third switch is configured to electrically connect a neutral point of the motor and both electrodes of the battery, and wherein the plurality of second switches comprises:

a fourth switch configured to connect at least one leg of the power factor corrector to any one of the AC power input terminal or an input terminal of the inverters;

a sixth switch provided between each end of the link capacitor; and a seventh switch provided between each end of the inverter.

9. The battery charger of claim 8, wherein the first switch provided at the AC power input terminal is configured to be turned on or off corresponding to a single-phase condition of the input AC power and a multiphase condition of the input AC power.

10. The battery charger of claim 9, wherein the plurality of second switches further comprises a fifth switch provided between the power factor corrector and the link capacitor.

11. The battery charger of claim 8, wherein:

a first leg of the power factor corrector is connected to a first AC power input line of the AC power input terminal;

a second leg of the power factor corrector is connected to any one of a second AC power input line of the AC power input terminal or the neutral line through the first switch; and a third leg of the power factor corrector is connected to any one of a third AC power input line of the AC power input terminal or the third switch through the fourth switch.

12. The battery charger of claim 8, wherein the conditions of the input AC power comprise the single-phase condition of the input AC power and the multiphase condition of the input AC power.

13. The battery charger of claim 8, wherein the conditions of the input AC power comprise a symmetric power condition of the input AC power and an asymmetric power condition of the input AC power.

14. A battery charger of an electric vehicle, comprising:

a motor configured to generate a driving force for driving the electric vehicle;

an inverter configured to supply power to the motor;

an alternating current (AC) power input terminal, wherein at least one of a single-phase input AC power or a multiphase input AC power is input to the AC power input terminal;

a power factor corrector comprising a single 3-leg half bridge circuit, wherein an input AC power is input to the single 3-leg half bridge circuit through the AC power input terminal;

a link capacitor charged by at least one of the power factor corrector, the motor, or the inverter;

a switch network comprising:
- a first switch configured to connect any one of an AC power input line or a neutral line to the power factor corrector, wherein the AC power input terminal comprises the AC power input line and the neutral line;
- a plurality of second switches configured to selectively connect the AC power input terminal to the power factor corrector, the link capacitor, or the inverter; and
- a third switch configured to electrically connect the motor to a high voltage battery; and a controller configured to control the power factor corrector and the switch network based on conditions of the input AC power that is input through the AC power input terminal, wherein the third switch is configured to electrically connect a neutral point of the motor and both electrodes of the battery, and wherein the plurality of second switches comprises:
- a fourth switch configured to connect at least one leg of the power factor corrector to any one of the AC power input terminal or an input terminal of the inverter;
- a fifth switch provided between the power factor corrector and the link capacitor;
- a sixth switch provided between each end of the link capacitor; and
- a seventh switch provided between each end of the inverter.

15. The battery charger of claim 14, wherein the first switch provided at the AC power input terminal is configured to be turned on or off corresponding to a single-phase condition of the input AC power and a multiphase condition of the input AC power.

16. The battery charger of claim 15, wherein:
- a first leg of the power factor corrector is connected to a first AC power input line of the AC power input terminal;
- a second leg of the power factor corrector is connected to any one of a second AC power input line of the AC power input terminal or the neutral line through the first switch; and
- a third leg of the power factor corrector is connected to any one of a third AC power input line of the AC power input terminal or the third switch through the fourth switch.

17. The battery charger of claim 15, wherein the conditions of the input AC power comprise the single-phase condition of the input AC power and the multiphase condition of the input AC power.

18. The battery charger of claim 15, wherein the conditions of the input AC power comprise a symmetric power condition of the input AC power and an asymmetric power condition of the input AC power.

* * * * *